(12) United States Patent
Campagnolo

(10) Patent No.: US 6,490,507 B1
(45) Date of Patent: Dec. 3, 2002

(54) COMPUTER FOR BICYCLES AND METHOD FOR OBTAINING RIDING INFORMATION

(75) Inventor: Valentino Campagnolo, Vicenza (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 09/442,391

(22) Filed: Nov. 18, 1999

(30) Foreign Application Priority Data

Dec. 29, 1998 (IT) .......................................... TO98A1095

(51) Int. Cl.[7] .............................. G06F 7/00; G05D 1/00; B62M 25/00
(52) U.S. Cl. .............................. 701/1; 701/36; 280/238; 73/162; 73/530; 235/95 R; 116/62.1
(58) Field of Search ....................... 701/36, 1; 280/200, 280/238, 288.4, 236, 260; 702/147; 73/162, 530; 235/95 R; 324/166; 116/62.1; 474/70, 71, 80

(56) References Cited

U.S. PATENT DOCUMENTS

| | | | | |
|---|---|---|---|---|
| 4,434,801 A | * | 3/1984 | Jiminez et al. | 128/689 |
| 4,862,395 A | * | 8/1989 | Fey et al. | 702/146 |
| 5,356,348 A | * | 10/1994 | Bellio et al. | 474/40 |

\* cited by examiner

*Primary Examiner*—William A. Cuchlinski, Jr.
*Assistant Examiner*—Brian J Broadhead
(74) *Attorney, Agent, or Firm*—Sughrue, Mion, Zinn, Macpeak & Seas, PLLC

(57) ABSTRACT

Computer for a bicycle includes a speed change with a chain transmission, including a plurality of front crown wheels (16) which can be driven in rotation by a pair of pedal cranks (18) and a plurality of rear sprockets (20), a first sensor (30) for providing an electric signal indicating the speed of rotation of one wheel of the bicycle, a second sensor (32) for providing an electric signal indicating the speed of rotation of the pedal cranks (18), and a third sensor (38) for providing an electric signal indicating which is the selected front crown wheel. The computer has a display (24) for displaying riding information of the bicycle, and an electronic control programmed so as to determine the number of teeth ($Z_p$) of the selected rear sprocket as a function of said signals and as a function of stored data indicating the number of teeth ($Z_c$) of the front crown wheels (16).

4 Claims, 1 Drawing Sheet

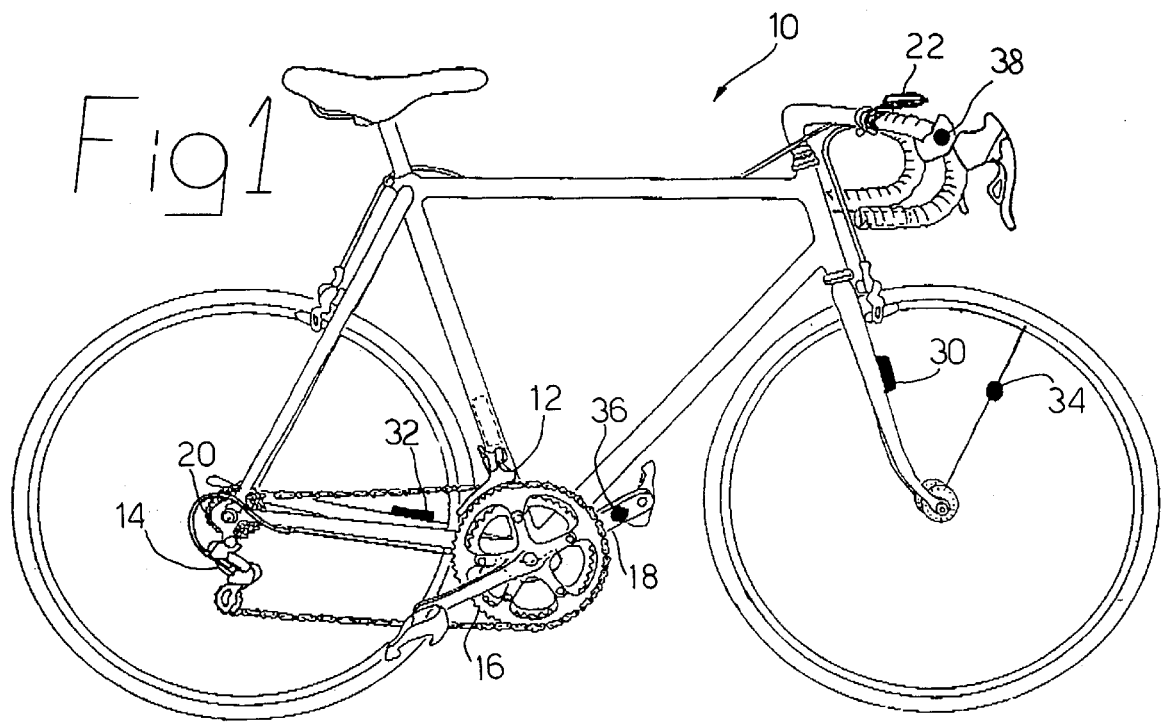
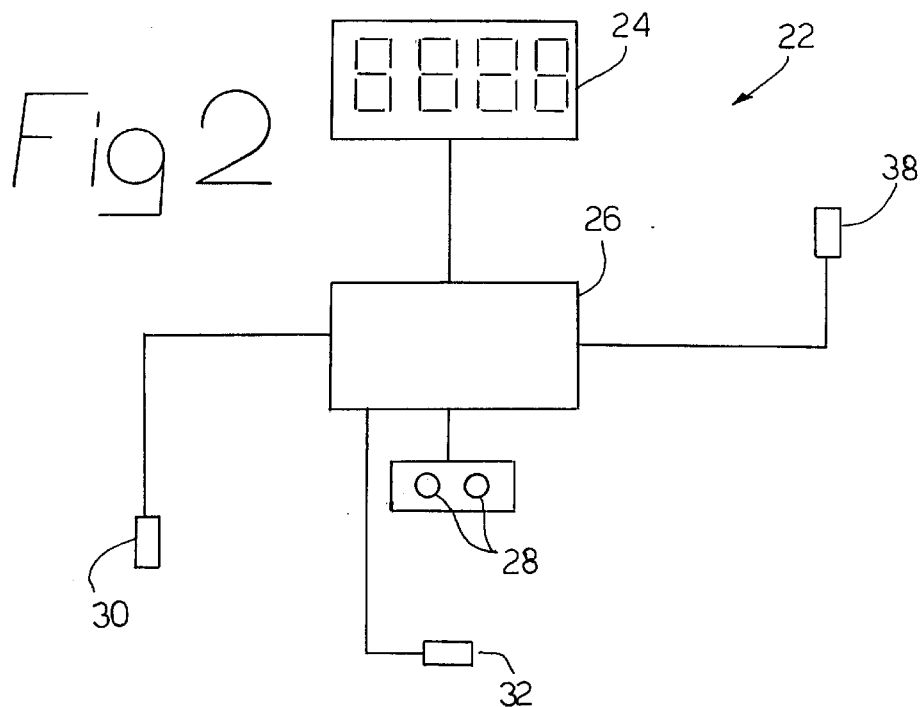

COMPUTER FOR BICYCLES AND METHOD FOR OBTAINING RIDING INFORMATION

BACKGROUND OF THE INVENTION

The present invention relates to a computer for bicycles and to a method for obtaining riding information of a bicycle.

Computers for bicycles are known which calculate and display a plurality of riding information which are useful for the rider, such as instant speed, riding distance, speed of rotation of pedal cranks, etc. There are also known computers for bicycles programmed for displaying which are the selected sprocket and crown wheel, on the basis of information received from sensors placed on speed change control units.

SUMMARY OF THE INVENTION

A particularly useful information for the riders is the selected transmission ratio. Riders are normally used to express the transmission ratio by indicating the number of teeth of the selected crown wheel and sprocket, for instance 52/14 or 42/24. With known computers for bicycles, for displaying the transmission ratio in this way it would be necessary to store in the computer the number of teeth of crown wheels and sprockets. This operation would be quite long, especially because of the great number of rear sprockets which in the most recent solutions reaches 9 or 10. In addition, it is quite frequent that the user periodically replaces the rear wheel and the respective group of sprockets, in order to better adapt the bicycle transmission ratios to the characteristics of the ride. With known computers for bicycles, the step of storing the number of teeth of the sprockets should be repeated each time the rear wheel is replaced.

The object of the present invention is to overcome the above drawbacks.

In accordance with the invention, this object is achieved by a computer for bicycles and by a method for detecting riding information of a bicycle, having the features forming the subject of the claims.

BRIEF DESCRIPTION OF THE DRAWINGS

The invention now will be disclosed with reference to the attached drawings, given purely by way of non-limiting example, in which:

FIG. 1 is a schematic lateral view of a race bicycle provided with a computer according to the present invention, and FIG. 2 is a diagram showing schematically the main operating elements of the computer for bicycles according to the invention.

DETAILED DESCRIPTION OF THE INVENTION

In FIG. 1 the numeral reference 1 indicates a race bicycle having a speed change with chain transmission, including a front derailleur 12 and a rear derailleur 14. In a known way, the derailleurs are controlled by control units placed on the handlebar. The speed change comprises, in a known way, a plurality of front crown wheels 16 which can be driven in rotation by means of a pair of pedal cranks 18, and a plurality of rear sprockets 20.

The bicycle 10 comprises a computer for bicycles 22 including a digital display 24 and a microprocessor electronic control unit 26 operatively associated with the display 22 and a series of push-buttons 28 through which the user has the possibility of selecting the information to be displayed and which are also used for storing in the control unit 26 some data relating to structural characteristics of the bicycle which are necessary for the proper operation of the computer.

The bicycle 10 is provided with a first sensor 30 for detecting the speed of rotation of a wheel, which can be mounted either on the front or rear wheel. A second sensor 32 is provided for detecting the speed of rotation of the pedal cranks 18. The sensors 30 and 32 can be common magnetic sensors which detect the passage in their proximity of respective magnets 34 and 36 fixed to the wheel and to a pedal crank and generate electric pulses with a frequency equal to the frequency of rotation of the wheel and, respectively, the pedal cranks.

The bicycle comprises also a third sensor 38 which determines which is the selected front crown wheel. This sensor can be placed in the control unit of the front derailleur and can be realized as disclosed in detail in the Italian patent application No. TO98A000759 of the same Applicant.

When the computer 22 is installed on the bicycle, it is necessary to store in the control unit 26 the following data:

number of teeth of the front crown wheels, and circumference of the wheel on which the sensor 30 is mounted.

If the sensor 30 is mounted on the front wheel and if this wheel has a circumference which is different from that of the rear wheel, it is also necessary to input the circumference of the rear wheel.

In operation, the control unit 26 calculates the number of teeth of the selected rear sprocket as a function of the signals coming from the sensors 30, 32 and 38 and depending on the stored data, using the following expressions:

a) if the sensor 30 is mounted on the rear wheel or if the wheels have the same diameter:

$$Z_p = V_p / V_R Z_c$$

where:

$Z_p$: number of teeth of the selected sprocket, $V_p$: speed of rotation of the pedal cranks [g/1'], $V_R$: speed of rotation of the wheel on which the sensor is mounted [g/1'], $Z_c$: number of teeth of the selected crown wheel, b) if the sensor 30 is mounted on the front wheel and the wheel have different diameters:

$$Z_p = V_p / V_R Z_c C_{Rp} / C_{Ra}$$

where:

$C_{Rp}$: circumference of the rear wheel [m], $C_{Ra}$: circumference of the front wheel [m].

If the user selects through the push-buttons 28 the function of displaying the selected transmission ratio, the control unit displays at the same time the number of teeth of the selected crown wheel and sprocket. The number of teeth of the sprocket, calculated as previously disclosed is a virtual number which before being displayed is rounded at the greatest value among those calculated in a certain period of time. The function of displaying the transmission ratio provides a reliable result only in riding conditions in which the chain is under tension. In riding conditions in which the speed of rotation of the pedal cranks is not correlated to the speed of movement of the bicycle (for instance during downhill riding) the value of the transmission ratio calculated is wrong.

Naturally, while the principle of the invention remains the same, the details of construction and the embodiments may widely vary with respect to what has been disclosed and illustrated purely by way of example, without thereby departing from the scope of the invention.

What is claimed is:

1. Computer for a bicycle comprising:

a speed change with a chain transmission, including a plurality of front crown wheels which can be driven in rotation by means of a pair of pedal cranks and a plurality of rear sprockets, first sensor means for providing an electric signal indicating the speed of rotation of one wheel of the bicycle, second sensor means for providing an electric signal indicating the speed of rotation of the pedal cranks, and third sensor means for providing an electric signal indicating which is the selected front crown wheel, the computer for bicycles comprising:

a display for displaying riding information of the bicycle, and electronic control means for receiving the output signals of said sensors means and for producing the display of said riding information, said electronic control means being programmed for determining the number of teeth of the selected rear sprocket as a function of said signals and as a function of stored data indicating the number of teeth of the front crown wheel.

2. Computer for bicycles according to claim 1, wherein said electronic control means are programmed for displaying on said display a selected transmission ratio with the indication of the number of teeth of the selected crown wheel and sprocket.

3. A method for detecting riding information of a bicycle comprising a speed change with chain transmission, including a plurality of front crown wheels which can be driven in rotation by a pair of pedal cranks and a plurality of rear sprockets, the method comprising the steps of:

detecting data indicating the speed of rotation of one wheel, detecting data indicating the speed of rotation of the pedal cranks, detecting data indicating which is the selected front crown wheel, processing said data and displaying on a display riding information of the bicycle, calculating in that the number of teeth of the selected rear sprocket as a function of said data and as a function of stored data indicating the number of teeth of the front crown wheels.

4. A method according to claim 3, wherein the selected transmission ratio is displayed on said display by indicating the number of teeth of the selected crown wheel and sprocket.

* * * * *